United States Patent [19]

Tominaga et al.

[11] 4,134,866

[45] Jan. 16, 1979

[54] AQUEOUS CATIONIC COATING FROM AMINE-EPOXY ADDUCT, POLYAMIDE, AND SEMI-BLOCKED POLYISOCYANATE, ACID SALT

[75] Inventors: Akira Tominaga; Yasuyuki Hirata, both of Hiratsuka, Japan

[73] Assignee: Kansai Paint Company, Limited, Amagasaki, Japan

[21] Appl. No.: 803,246

[22] Filed: Jun. 3, 1977

[51] Int. Cl.$^2$ .................... C08J 3/06; C08L 63/02; C25D 13/06
[52] U.S. Cl. .................... 260/18 PN; 204/181 C; 260/29.2 EP; 260/29.2 TN; 260/830 P; 260/835; 528/45
[58] Field of Search ............ 260/29.2 TN, 18 PN

[56] References Cited

U.S. PATENT DOCUMENTS

| | | | |
|---|---|---|---|
| 3,336,253 | 8/1967 | Wong et al. | 260/29.2 EP |
| 3,799,854 | 3/1974 | Jerabek | 260/29.2 TN |
| 3,922,253 | 11/1975 | Jerabek et al. | 260/77.5 TB |
| 3,947,338 | 3/1976 | Jerabek et al. | 260/29.2 TN |
| 4,017,438 | 4/1977 | Jerabek et al. | 260/29.2 TN |
| 4,036,795 | 7/1977 | Tominaga | 260/29.2 TN |

*Primary Examiner*—Murray Tillman
*Assistant Examiner*—Arthur H. Koeckert
*Attorney, Agent, or Firm*—Larson, Taylor and Hinds

[57] ABSTRACT

A cationic electrophoretic coating composition comprises a resinous binder which is prepared by reacting an epoxy resin-amine adduct (A) with a partially blocked polyisocyanate (C) and mixing or reacting a polyamide (B) with the resulting product, or by reacting a polyamide (B) with a partially blocked polyisocyanate (C) and mixing or reacting an epoxy resin-amine adduct (A) with the resulting product.

21 Claims, No Drawings

AQUEOUS CATIONIC COATING FROM AMINE-EPOXY ADDUCT, POLYAMIDE, AND SEMI-BLOCKED POLYISOCYANATE, ACID SALT

This invention relates to cationic electrophoretic coating compositions and to a process for preparing the same.

By the term cationic electrophoretic coating composition is meant an aqueous composition which is prepared by neutralizing a resin with an acid to render the resin water-soluble and dissolving or dispersing the resin in water and which is capable of electrophoretically forming a film on an article serving as the cathode for coating operation. Heretofore known as such a cationic electrophoretic coating composition is a composition prepared by mixing a reaction product of a bisphenol A-epichlorohydrin type epoxy resin and a primary or secondary amine with an isocyanate compound having partially blocked isocyanate groups. When electrophoretically applied, the composition is baked to deblock the isocyanate groups to effect reaction between the epoxy resin and the isocyanate compound, whereby a hardened film is obtained.

The coating film thus produced from the composition, despite its high corrosion resistance afforded by the epoxy resin, has the drawbacks of being inferior in surface smoothness and impact resistance and is therefore unfit for use as a primer for motor vehicles and the like. To eliminate such drawbacks, it is known to modify the epoxy resin with a fatty acid or to modify the blocked isocyanate compound with an polyalkylene polyol. However, such a method still involves the difficulty that the modification leads to lower corrosion resistance.

An object of this invention is to provide cationic electrophoretic coating compositions capable of forming films which are excellent in corrosion resistance, surface smoothness and impact resistance, and a process for preparing the same.

The above and other objects of this invention will become apparent from the following description.

The cationic electrophoretic coating composition of this invention comprises an aqueous medium and a resinous binder dissolved or dispersed therein, the resinous binder being an acid neutralized product said product being at least one selected from the group consisting of:

(1) a mixture of (a) a reaction product of an epoxy-amine adduct (A) and a partially blocked polyisocyanate (C), in the weight ratio of from 90 to 15 of (A) to from 10 to 85 of (C), and (b) a polyamide (B), the weight ratio of (a) to (b) being from 30 to 90 of the former as calculated by the amount of (A) to from 70 to 10 of the latter;

(2) a reaction product of (a) a reaction product of an epoxy-amine adduct (A) and a partially blocked polyisocyanate (C), and (b) a polyamide (B), the weight ratio of (A) to (C) in (a) and the weight ratio of of (a) to (b) being the same as in (1);

(3) a mixture of (c) a reaction product of a polyamide (B) and a partially blocked polyisocyanate (C), in the weight ratio of from 85 to 10 of (B) to from 15 to 90 of (C), and (d) an epoxy-amine adduct (A), the weight ratio of (c) to (d) being from 70 to 10 of the former as calculated by the amount of (B) to from 30 to 90 of the latter; and (4) a reaction product of (c) a reaction product of a polyamide (B) and a partially blocked polyisocyanate (C), and (d) an epoxy-amine adduct (A), the weight ratio of (B) to (C) in (c) and the weight ratio of (c) to (d) being the same as in (3), said epoxy-amine adduct (A) being a reaction product prepared by reacting an epoxy resin with a basic amino compound having at least one basic amino group, said polyamide (B) being a polyamide having at least one basic amino group and said partially blocked polyisocyanate (C) being a polyisocyanate compound having at least one blocked isocyanate group in the molecule and an average of more than zero to not more than one free isocyanate group per molecule.

Thus when the reaction product of (A) and (C) is used as one of the components of the binder according to this invention, (B) is used as the other component, while when the reaction product of (B) and (C) is used as one of the components,, (A) is used as the other component. The mixture or reaction product of the two components is used as the binder of the cationic electrophoretic coating composition.

The binders of this invention have more improved water-dispersibility than those disclosed in U.S. Pat. application Ser. No. 612,281, now U.S. Pat. No. 4,036,795. Additionally, the coating films prepared from the compositions of this invention have excellent properties, particularly in corrosion resistance.

The epoxy-amine adduct (A) to be used in this invention is a reaction product obtained by reacting an epoxy resin with a basic amino compound having at least one basic amino group. The reaction product of epoxy resin and basic amino compound is not particularly limited as to the reaction conditions under which it is prepared, insofar as it is obtained by the reaction therebetween. Usable as the epoxy resin are those obtained from phenolic compound and epichlorohydrin, containing at least two epoxy groups per molecule and usually having a molecular weight of about 200 to 4,000, preferably about 400 to 2,000. More specific examples of phenol type resins are epoxy resin prepared from bisphenol A and epichlorohydrin, epoxy resin prepared from hydrogenated bisphenol A and epichlorohydrin, epoxy resin prepared from bisphenol A and $\beta$-methylepichlorohydrin, polyglycidyl ether of novolak resin etc., among which especially preferable is the epoxy resin obtained from bisphenol A and epichlorohydrin. With this invention such phenol type epoxy resin is usable conjointly with polyepoxide compounds such as polyglycidyl ether of ethylene glycol, propylene glycol, glycerin, trimethylolpropane or like polyhydric alcohol, polyglycidyl ester of adipic acid, phthalic acid, dimer acid or like polycarboxylic acid, polyepoxide obtained by epoxidizing alicyclic olefin or 1,2-polybutadiene, etc. The polyepoxide compounds can be employed in an amount of up to about 50% by weight so as not to impair corrosion resistance of phenol type epoxy resins.

Exemplary of the basic amino compound to be reacted with the epoxy resin are aliphatic or alicyclic amino compounds having a primary and/or secondary amino group. Preferable examples are monoamines such as mono- or dialkylamine, mono- or di-alkanol amines and polyamines such as polyalkylene polyamines, etc. Useful monoamines are mono- or di-alkylamines having about 1 to 18 carbon atoms, such as propylamine, butyl-amine, diethylamine, dipropylamine, etc. Examples of mono- or di-alkanol monoamines are ethanolamine, propanolamine, diethanolamine, dipropanolamine, etc. Useful examples of other monoamines are piperidine, cyclohexylamine, pyrrolidine, morpholine, etc. Examples of polyalkylene polyamines are ethylenediamine, hexamethylenediamine, diethylenetriamine, triethylenetetramine, tetraethylenepentamine, propylenediamine, dipropylenetriamine, butylenediamine. Examples of other polyamines are N-aminoethanolamine, diethylethylenediamine, diethylaminopropylamine, hydroxyethylaminopropylamine, monomethylaminopropylamine, piperazine, N-methylpiperazine, N-aminoethylpiperazine, etc. Particularly preferable are water-soluble aliphatic monoamines such as diethylamine, diethanolamine, etc. in respect of the reactivity with epoxy resin. According to this invention, an aromatic amine can be used in combination with the aliphatic or alicyclic amine in such amount that the reaction product of epoxy resin and basic amine, when neutralized with acid, will still remain dispersible in water. Examples of useful aromatic amines are aniline, N-methylaniline, toluidine, benzylamine, m-xylylenediamine, m-phenylenediamine, 4,4'-diaminodiphenylmethane, etc. Use of such aromatic amine achieves the effect of increasing resistances to water and corrosion of the coating film.

The reaction of epoxy resin with basic amino compound, which is exothermic, is effected simply when the reactants are mixed together at room temperature. To complete the reaction promptly, however, it is preferable to heat the reaction system at a temperature of about 50 to 150° C, advantageously at about 70 to 130° C. The basic amino compound to be reacted with the epoxy resin may be used at least in such amount that the resulting product can be rendered soluble in water when neutralized with an acid. However, when a primary monoamine only is used as the basic amino compound, 0.5 to 1 mole of total mole of the amine is preferably used per equivalent of the epoxy group in order to prevent gelation. Further when a polyamine only is used, it is desirable to use at least ⅜ mole of the amine per equivalent of the epoxy group to avoid gelation. It is often perferable in such a case to effect the reaction by adding an epoxy resin dropwise to an amine and to thereafter remove the unreacted amine by vacuum distillation or extraction. It is preferable to use solvents in which the epoxy resin and amino compound are soluble and which are miscible with water. Examples thereof are iso-propanol, sec-butanol, tert-butanol, ethylene glycol monoethyl ether, diethylene glycol monoethyl ether (carbitol) and like alcohols, ethyl acetate, butyl acetate, ethylene glycol monoethyl ether acetate, carbitol acetate and like esters, methyl ethyl ketone, diisobutyl ketone, methyl isobutyl ketone, diacetone alcohol, diacetone alcohol methyl ether (Pentoxone) and like ketones. When the solvent is used, the amount thereof is usually up to about 60% by weight, preferably about 10 to 40% by weight, based on the total amount of the epoxy resin and the amino compound.

The polyamide (B) to be used in this invention is a polyamide having at least one basic amino group. More specific examples are polyamide prepared by condensation of dicarboxylic acid and polyamine, polyamide obtained by reacting polyamine with oligomer prepared by the ringopening polymerization of lactam such as ε-caprolactam, polyesterpolyamide of alkanolamine and dicarboxylic acid, etc. Useful dicarboxylic acids are those represented by general formula

wherein R is a saturated or unsaturated aliphatic hydrocarbon group or aromatic hydrocarbon group having 1 to 34 carbon atoms. Preferable examples are phthalic acid, malonic acid, maleic acid, fumaric acid, succinic acid, azelaic acid, adipic acid, sebacic acid, dodecylsuccinic acid, dimer acid, etc. The polyamines are polyalkylene polyamines having primary amino group at both ends of main chain, represented by general formulas

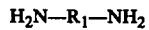

or

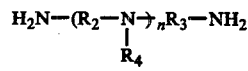

wherein $R_1$, $R_2$ and $R_3$ are aliphatic hydrocarbon group having 2 to 6 carbon atoms respectively, $R_4$ is hydrogen or aliphatic hydrocarbon group having 1 to 3 carbon atoms and n is an integer of 1 to 6. Preferable examples are ethylenediamine, propylenediamine, butylenediamine, hexamethylenediamine, tetraethylenepentamine, pentaethylenehexamine, hexaethyleneheptamine, heptaethyleneoctamine, diethylenetriamine, triethylenetetramine, bis(3-aminopropyl)-amine, 1,3-bis(3'-aminopropylamino)propane, etc. Useful alkanolamines include those having 2 to 6 carbon atoms such as ethanolamine, propanolamine, hydroxyethylaminopropylamine, etc. Since the polyamide (B) must have an amino group, there is the necessity of reacting the dicarboxylic acid with an excess of polyamine or alkanolamine. For example, one mole of dicarboxylic acid is reacted with 0.8 to 2.0 moles of polyamine or with 1.0 to 2.0 moles of alkanolamine, or up to one mole of polyamine is reacted with one mole of an oligomer prepared by the ring-opening polymerization of a lactam. Such reaction is conducted at a temperature of 100 to 250° C in a nitrogen atmosphere, or at a temperature of 70 to 200° C at reduced pressure, while removing the resulting water from the system.

In order to obtain polyamides soluble in organic solvents and having low melting points and low viscosities, it is preferable to at least partially use a dimeric fatty acid as the dicarboxylic acid and diethylenetriamine or like polyalkylenepolyamine as the polyamine.

The partially blocked polyisocyanate (C) to be used in this invention is a polyisocyanate compound having at least one blocked isocyanate group in the molecule and an average of more than zero to not more than one free isocyanate group per molecule. If the compound contains less than one blocked isocyanate group in the molecule, the resulting electrophoretic coating composition tends to exhibit lower curability when baked, whilst if the average number of free isocyanate groups per molecule is in excess of one, gelation is liable to take place in the course of contact between the partially blocked polyisocyanate compound and the reaction product of epoxy resin and basic amino compound, or polyamide having basic amino groups, hence objectionable.

The partially blocked polyisocyanate can be readily prepared by reacting a polyisocyanate compound having at least two isocyanate groups in the molecule with a blocking agent in an amount sufficient to permit the resulting product to contain more than zero to not more than one free isocyanate group per molecule on average. Because this reaction is highly exothermic, it is desirable to add the blocking agent dropwise to the polyisocyanate compound. Preferably the reaction is carried out at a low temperature of about 20 to 80° C. Examples of useful polyisocyanate compounds are those containing at least two isocyanate groups in the molecule, such as m- or p-phenylene diisocyanate, 4, 4'-diphenyl methane diisocyanate, 2,4- or 2,6-tolylene diisocyanate, m- or p-xylylene diisocyanate and like aromatic diisocyanate compounds; hexamethylene diisocyanate, dimer acid diisocyanate, isophorone diisocyanate and like aliphatic or alicyclic diisocyanate compounds; adducts of such aromatic, aliphatic or alicyclic diisocyanate compounds and ethylene glycol, propylene glycol, glycerin, trimethylolpropane, pentaerythritol and like polyols; trimers of such aromatic, aliphatic or alicyclic diisocyanates; etc. Preferable among these examples are aromatic polyisocyanate such as tolylene diisocyanate, xylylene diisocyanate, and adduct of tolylene diisocyanate or xylylene diisocyanate and polyol.

The blocking agents to be used are volatile low-molecular-weight active hydrogen compounds such as methanol, ethanol, propanol, butanol, hexanol, cyclohexanol, benzyl alcohol, ethylene glycol monoethyl ether, ethylene glycol monobutyl ether and like aliphatic, alicyclic or aromatic monoalcohols, dimethyl- or diethyl-amino ethanol and like hydroxy tertiary amines, acetoxime, methyl ethyl ketone oxime and like oximes, acetylacetone, acetoacetate, malonate and like active methylene compound, phenol, ε-caprolactam, etc. Preferable among these examples are aliphatic monoalcohols.

The resin composition, the main component of the composition of this invention, can be prepared from the compounds (A), (B) and (C) by reacting the epoxy resin-amine adduct (A) with the polyisocyanate (C) and mixing or reacting the polyamide (B) with the resulting product, or by reacting the polyamide (B) with the polyisocyanate (C) and mixing or reacting the epoxy resin-amine adduct (A) with the resulting product. In either case, the ingredients (A) and (B) can be rendered more compatible with each other by allowing some of the epoxy groups of the adduct (A) to react with the amino groups of the polyamide (B). The amount of epoxy groups to be caused to remain in the adduct (A) for the above-mentioned reaction is preferably such that the adduct prepared will not gel or will not have too high a viscosity, namely not more than one per molecule of the epoxy resin.

The reaction between the partially blocked polyisocyanate (C) and the epoxy resin-amine adduct (A) or the polyamide (B) must be conducted without permitting the dissociation of the blocked isocyanate groups so as to avoid gelation. The reaction temperature is 40 to 140° C, preferably 60 to 120° C. To protect the primary amino groups contained in the compound (A) and/or compound (B) and to allow a sufficient quantity of amino groups to remain for the solubilization of the product with an acid or for the prevention of gelation, it is preferable to react (A) and/or (B) with acetone, methyl ethyl ketone, diethyl ketone, methyl isobutyl ketone or like ketone having a substituent which is less prone to steric hindrance and to convert some of the primary amino groups to ketimine for protection prior to the above reaction. The ketimine forming reaction can be readily effected by heating the reactants at a temperature of at least 100° C while distilling off the resulting water.

In order to enable the reaction of (C) with (A) or (B) to give a reaction product of reduced viscosity free of gelation, the reaction may be conducted with the use of a solvent inactive to the isocyanate group, such as isopropyl alcohol, sec-butyl alcohol, tert-butyl alcohol, ethyl acetate, butyl acetate, cellosolve acetate, carbitol acetate, diethylene glycol dimethyl ether, diisobutyl ketone, methyl isobutyl ketone, Pentoxone, or the like.

(1) When the reaction product of (A) and (C) is mixed with (B), this procedure is carried out at room temperature, while when the reaction product is reacted with (B), the reaction is conducted with heating at up to 150° C, preferably at 80 to 130° C.

(2) When the reaction product of (B) and (C) is mixed or reacted with (A), the same conditions as above (1) are usable.

The reaction of (A) with (C) in the paragraph (1) above is conducted in the weight percent ratio of from 90 to 15 of (A) to from 10 to 85 of (C), preferably from 75 to 25 of (A) to from 25 to 75 of (C). When the reaction product of (A) and (C) is mixed or reacted with (B) as stated in the paragraph (1) above, the former to latter ratio in percent by weight, with the former calculated as the amount of (A), is from 30 to 90 of (A) to from 70 to 10 of (B), preferably from 40 to 80 of (A) to from 60 to 20 of (B). In the reaction of (B) with (C) in the paragraph (2), the (B) to (C) ratio in percent by weight is from 85 to 10 of (B) to from 15 to 90 of (C), preferably from 70 to 25 of (B) to from 30 to 75 of (C). When the reaction product of (B) and (C) is mixed or reacted with (A), the former to latter ratio in percent by weight, with the former represented by the amount of (B), is from 70 to 10 of (B) to from 30 to 90 of (A), preferably from 60 to 20 of (B) to from 40 to 80 of (A). When the ingredients are used in the above-mentioned ranges, the resulting compositions give coating films having improved properties in respect of corrosion resistance, hardness, surface smoothness and impact resistance.

The amine value of the resulting resinous product is generally about 25 to 400, preferably 50 to 200. If the amine value is within the above range, the coating composition has good water-dispersibility or excellent throwing power and the coating film obtained therefrom exhibits superior corrosion resistance.

The resinous binder is then neutralized with an acid and is thereby rendered soluble or dispersible in water. The acid to be used for neutralization is formic acid, acetic acid, propionic acid, butyric acid, hydroxyacetic acid, lactic acid or like water-soluble organic acid, or hydrochloric acid, phosphoric acid or like water-soluble inorganic acid. The acid is used in such amount that it is at least sufficient to render the binder soluble or dispersible in an aqueous medium and is not more than the equivalent of the amino groups contained in the binder. The aqueous composition obtained by being neutralized with the acid and is dissolved or dispersed in an aqueous medium usually has a binder concentration of about 3 to 30% by weight, preferably of about 5 to 15% by weight and a pH of about 3 to 9, preferably of about 5 to 7.

The aqueous medium to be used in this invention is water or a mixture of water and an organic solvent. Useful organic solvents are a wide variety of those miscible with water such for example as ethanol, isopropanol, sec-butanol, ethylene glycol monoethyl ether, ethylene glycol monobutyl ether and like alcohols, butyl acetate, ethylene glycol monoethyl ether acetate, carbitol, carbitol acetate and like esters, methyl ethyl ketone, diacetone alcohol and like ketones. The solvent is used, usually in an amount of up to 50% by weight based on water.

The aqueous solution or dispersion of the electrophoretic coating composition of this invention may contain a pigment, surfactant, curing catalyst and the like as desired. Useful pigments include coloring pigments and extender pigments. Examples of coloring pigments are various usual coloring pigments such as red iron oxide, titanium dioxide, carbon black, etc. Examples of extender pigments are clay, mica, talc, calcium carbonate and like usual extender pigments. The surfactant can be used, although it is not always necessary since the composition is fully soluble or dispersible in water without the surfactant. Usable are for example nonionic surfactants such as polyoxyethylene glycol or polyoxypropylene glycol and their derivatives. Further usable as the curing catalyst are a wide variety of usual curing catalysts such, for example, as acetate, naphthenate, oleate, chromate, phosphate and like salts of bismuth, lead, tin, iron, cobalt, nickel, aluminum, zinc, manganese, copper, zirconium and like metals.

The present composition may also contain a neutral or cationic water-soluble resin which is compatible therewith in such amount that it will not impair corrosion resistance of the composition. Exemplary of neutral resins are water-soluble phenol resin, water-soluble melamine resin, polyacrylamide, methylolated polyacrylamide, polyvinyl alcohol, polyvinyl acetate, polyvinylpyrrolidone, and polyvinyl methyl ether. Examples of cationic resin are copolymer comprising dialkylaminoethyl methacrylate or dialkylaminopropyl methacrylate, addition product of glycidyl methacrylate copolymer and secondary amine.

The aqueous solution or dispersion of the present coating composition can be electrophoretically applied with satisfactory results by employing usual electrophoretic coating apparatus. The article to be coated serves as the cathode and an ordinary carbon plate as the anode. The electrophoretic coating operation may be conducted under usual conditions. For example, the coated article is then baked for curing usually at a temperature of 150 to 250° C, preferably of 170 to 210° C for 15 to 45 minutes. When the coating is baked, the blocked isocyanate groups in the resin release the blocking agent and undergo cross-linking reaction with the amino, amido, hydroxyl and like groups in the resin to effect curing.

The electrophoretic coating composition of this invention is suitable for coating usual steel sheets treated with zinc phosphate and iron phosphate as well as untreated steel sheets which are prone to corrosion. The coated sheets obtained, although free from a hexavalent chromium compound, exhibit high corrosion resistance. This is an outstanding feature of this invention which has not been attained by the conventional electrophoretic coating compositions. The present composition is also suitable for coating zinc-plated and tin-plated steel sheets, and aluminum, copper and copper alloy substrates.

This invention will be described below in greater detail with reference to examples, in which parts and percentages are all by weight. The amine values in the examples are determined by the following method.

Determination of amine value

A 0.2 to 0.3 quantity of specimen is placed into a 100-ml Erlenmeyer flask and melted by heating. After cooling, the specimen is titrated with 1/10N aqueous HCl solution using Bromophenol Blue as an indicator. The amount of the titrant is measured when the color has changed from blue to yellow to calculate the amine value from the following equation:

$$\text{Amine value} = \frac{\text{Amount of 1/10N HCl soln. (ml)} \times \text{Factor of 1/10N HCl soln.}}{\text{Amount of specimen (g)} \times \text{Solid content (\%)} \times \frac{1}{100}} \times 5.61$$

EXAMPLE 1

A 200-part quantity of epoxy resin of the bisphenol A type (trade mark: "Epikote 828," product of Shell Chemical Co., Ltd., Japan), 190 in epoxy equivalent, is dissolved in 160 parts of ethylene glycol monoethyl ether acetate, and 105 parts of diethanolamine is added dropwise to the solution at 40 to 60° C. After heat generation has ceased, the mixture is maintained at an elevated temperature of 110° C for 1 hour to obtain an epoxy resin-amine reaction product having an amine value of 180.

To 348 parts of tolylene diisocyanate (a mixture of 80% 2,4-tolylene diisocyanate and 20% 2,6-tolylene diisocyanate, the same as hereinafter) is added dropwise 163 parts of n-butanol at a temperature of up to 50° C over a period of 2 hours. The mixture is maintained at 60° C for 1 hour to prepare a partially blocked diisocyanate having a mole ratio of 1:1.1 (tolylene diisocyanate:n-butanol).

The partially blocked diisocyanate (511 parts) is added to the epoxy resin-amine reaction product obtained above, and the resulting mixture is maintained at about 80° C for 2 hours to prepare an amine-adducted epoxy resin containing blocked isocyanate groups.

To the amine-adducted epoxy resin is added at room temperature 400 parts of polyamide resin of the dimer acid type having an amine value of 100 and a softening point of 40° C (trade mark: "Tohmide 210," product of Fuji Kasei Co., Ltd., Japan) dissolved in 80 parts of ethylene glycol monoethyl ether, to obtain a composition containing 83.4% of solids and having an amine value of 96.

To a portion of the resin composition (120 parts) are added 6.4 parts of acetic acid and 873.6 parts of deionized water to obtain a uniform aqueous dispersion containing about 10% of nonvolatiles and having a pH of 6.0. Using the dispersion as an electrophoretic coating bath, a steel sheet treated with zinc phosphate as the cathode and a carbon plate as the anode, the steel sheet is electrophoretically coated at 25° C and 200V for 2 minutes. The steel sheet is thereafter withdrawn from the bath and baked at 180° C for 20 minutes to obtain a 28-micron thick cured film having a pencil hardness of 2H. The film has the following properties:

Impact resistance (½ in., 1 kg, 50 cm): No change
Corrosion resistance (240 hrs.): No change
Surface smoothness: Excellent These properties are measured by the following method:

Pencil Hardness

Leave a test panel to stand in a constant temperature and constant humidity chamber at a temperature of 20 ± 1° C and a humidity of 75% for 1 hour. Fully sharpen a pencil (trade mark "UNI," product of Mitsubishi Pencil Co., Ltd., Japan) by a pencil sharpner and then wear away the sharp pencil point to flatness. Firmly press the pencil against the coating surface of the test panel at an angle of 45° between the axis of the pencil and the coating surface and push the pencil forward at a constant speed of 3 cm/sec. as positioned in this state. Repeat the same procedure 5 times with each of pencils having various hardness. The hardness of the coating is expressed in term of highest of the hardness of the pencils with which the coating remains unbroken at more than 4 strokes.

Impact resistance

After leaving the coated plate to stand in a constant temperature and constant humidity chamber at a temperature of 20 ± 1° C and a humidity of 75% for 1 hour, the following test is conducted in the same chamber. A bearer and a center of impact of sizes (½ inch in diameter) are fitted to a Du Pont impact tester and the plate is put between them, turning the coated surface of the plate upward. The weight (1 kg) is dropped on the center of impact from the prescribed height and the plate is taken out, and after having been left for an hour in the room, the damage of surface is observed.

Corrosion resistance

Diagonal cut lines is formed in the film on the test plate to such an extent as to reach the base plate. The test plate is then subjected to brine spray test using 5% aqueous solution of common salt at a temperature of 35° C and a humidity of 100%.

Surface smoothness

Determined with the naked eye.

EXAMPLE 2

A 500-part quantity of epoxy resin of the bisphenol type (trade mark: "Epikote 1001," product of Shell Chemical Co., Ltd., Japan), 500 in epoxy equivalent, is dissolved in 181 parts of isopropyl alcohol and 36.5 parts of diethylamine and 66.5 parts of diisopropanolamine are added dropwise to the solution at 60 to 70° C. The mixture is maintained at an elevated temperature of 90° C for 1 hour to obtain an epoxy resin-amine reaction product having an amine value of 93.

A 400-part quantity of liquid polyamide resin having an amine value of 300 (trade mark: "Versamid 125", product of Daiichi General Co., Ltd., Japan) is dissolved in 240 parts of methyl isobutyl ketone, and the solution is refluxed with heating at 130° C for 6 hours while distilling off the resulting water to convert the primary amino groups to ketimine. The reaction mixture is cooled to 60° C, and is then added dropwise thereto 386 parts of a partially blocked diisocyanate (mole ratio; 1:1.5) prepared from 217 parts of tolylene diisocyanate and 169 parts of ethylene glycol monoethyl ether in the same manner as in Example 1. After maintaining the resulting mixture at 80° C for 2 hours, a polyamide containing blocked isocyanate groups having an amine value of 76 is obtained.

The polyamide is mixed at room temperature with the epoxy resin-amine reaction product obtained above to give a resin composition containing 77% of solids and having an amine value of 84.

To the composition (130 parts) are added 6.0 parts of propionic acid and 114 parts of deionized water to prepare an aqueous dispersion containing 40% of solids. To the aqueous dispersion (62.5 parts) are added 12.5 parts of red iron oxide, 12.5 parts of titanium dioxide, 5 parts of talc, 1 part of lead acetate and 20 parts of water, and the mixture is kneaded in a ball mill for 20 hours. To the resulting mixture are further added 187.5 parts of the 40% aqueous dispersion and 700 parts of deionized water to prepare an electrophoretic bath containing about 13% of solids and having a pH of 5.5. Using a steel sheet treated with iron phosphate as the cathode and a carbon plate as the anode, the steel sheet is electrophoretically coated in the bath at 30° C and 190 V for 3 minutes. The steel sheet is thereafter baked at 170° C for 30 minutes to obtain a 24-micron thick cured film having a pencil hardness of 4H. The bath has a throwing power (determined by pipe method) of 17.0 cm at the same voltage.

The film has the following properties:
Impact resistance (½ in., 1 kg, 50 cm): No change
Corrosion resistance (720 hrs.): No change
Surface smoothness: Excellent
Erichsen value: 7 mm or higher Impact resistance, corrosion resistance and surface smoothness are measured in the same manner as in Example 1 respectively. Erichsen value is determined by the following method:

Erichsen value:

The coated plate is placed in a constant temperature and humidity chamber kept at 20° C and a humidity of 75% for one hour. Thereafter, the plate is set on Erichsen testing machine.

A punch having a radius of 10 mm is pushed outward predetermined distance in contact with the rear face of the plate at as uniform a speed as possible of about 0.1 mm/sec. The pushed-out portion of the plate is checked by the naked eye for cracking or peeling immediately after pushing out to determine the maximum distance (mm) of stroke of the punch causing no change on the coating.

EXAMPLE 3

A 950-part quantity of epoxy resin of the bisphenol A type (trade mark: "Epikote 1004," product of Shell Chemical, Co., Ltd., Japan), 950 in epoxy equivalent and 130 parts of alicyclic epoxy resin, 130 in epoxy equivalent (trade mark: "Chissonox 221," product of Chisso Co., Ltd., Japan), are dissolved in 300 parts of carbitol acetate, 49 parts of diethylamine is added dropwise to the solution at 60 to 80° C and the resulting mixture is maintained at 100° C for 2 hours to obtain an epoxy resin-amine reaction product having an epoxy equivalent of about 3200 and an amine value of 38.

A 400-part quantity of polyamide resin having an amine value of 350 (trade mark: "Versamid 140", product of Daiichi General Co., Ltd., Japan) is dissolved in 250 parts of diethyl ketone, and the solution is refluxed with heating for 8 hours while distilling off the resulting water to convert the primary amino groups to ketimine. The reaction mixture is cooled to 60° C, and is then added dropwise thereto 387 parts of a partially blocked diisocyanate (mole ratio, 1:1) prepared from 252 parts of hexamethylene diisocyanate and 135 parts of ethylene glycol monoethyl ether in the same manner as in Example 1. After maintaining the resulting mixture at 80° C for 1 hour, a polyamide containing blocked isocyanate groups having an amine value of 85 is obtained.

The polyamide is mixed with the epoxy resin-amine reaction product obtained above and the mixture is reacted at 80° C for 1 hour to obtain a composition containing about 77% of solids and having an amine value of 55. To the composition (130 parts) are added 4.5 parts of acetic acid and 115.5 parts of deionized water to prepare an aqueous dispersion containing 40% of nonvolatiles. The same procedure as in Example 2 is thereafter followed to prepare a pigment-dispersed composition containing 13% of nonvolatiles and having a pH of 4.5. The electrophoretic coating bath thus formulated has a throwing power of 20.5 cm at 250 V for 3 minutes. A zinc phosphate-treated steel sheet is electrophoretically coated in the bath at 30° C and 250 V for 3 minutes. The coated sheet is baked at 200° C for 15 minutes to obtain a 20-micron thick film having a pencil hardness of 3H. The film has the following properties:

Impact resistance (½ in., 1 kg, 50 cm): No change
Corrosion resistance (960 hrs.): No change
Surface smoothness: Excellent The above properties are determined in the same manner as in Example 1.

EXAMPLE 4

A 950-part quantity of epoxy resin of the bisphenol A type (trade mark: "Epikote 1004, " product of Shell Chemical Co., Ltd., Japan), 950 in epoxy equivalent is dissolved in 200 parts of butyl acetate, and the solution is added dropwise to 70 parts of ethylenediamine in 100 parts of butyl acetate at 60° C. The mixture is maintained at 80° C for 2 hours, and the solvent and unreacted amine are removed under a reduced pressure to obtain an epoxy resin-amine reaction product having an amine value of 180. A 628-part quantity of 75% ethyl acetate solution of polyisocyanate (trade mark: "Desmodur L," product of Bayer A. G. West Germany) obtained from 1 mole of trimethylolpropane and 3 moles of tolylene diisocyanate is added dropwise to 130 parts of ethylene glycol monoethyl ether at a temperature of up to 50° C, and the mixture is maintained at 70° C for 2 hours to give 758 parts (solids) of partially blocked polyisocyanate.

The partially blocked polyisocyanate is added dropwise at 80 to 100° C to the epoxy resin-amine reaction product obtained above, and the resulting mixture is maintained at 100° C for 2 hours to prepare an amine-adducted epoxy resin containing blocked isocyanate groups having about 63% of solids and an amine value of 40.

To the amine-adducted epoxy resin is added 400 parts of polyamide resin of the dimer acid type having an amine value of 100 and a softening point of 40° C (trade mark: "Tohmide 210", product of Fuji Kasei Co., Ltd., Japan) dissolved in 80 parts of ethylene glycol monoethyl ether, and the mixture is maintained at 80° C for 1 hour to obtain a resin composition containing about 68% of solids and having an amine value of 60. To the composition (160 parts) are added 6.5 parts of lactic acid and 112.5 parts of deionized water to prepare an aqueous dispersion containing 40% of solids. Following the same procedure as in Example 2, the dispersion is formulated into a pigment-dispersed composition containing 13% of nonvolatiles and having a pH of 6.0. The composition is used as an electrophoretic coating bath to coat a degreased steel sheet at 280 V for 3 minutes. The coated sheet is baked at 180° C for 30 minutes to obtain a 18-micron thick film having a pencil hardness of 3H.

The film has the following properties:
Impact resistance (½ in., 1 kg, 50 cm): No change
Corrosion resistance (480 hrs.): No change
Surface smoothness: Excellent
Erichsen value: 7 mm or higher The above properties are determined in the same manner as in Example 2.

EXAMPLES 5 TO 12

The starting materials listed in Table 1 below are used to prepare reaction products in the same manner as in Example 1. The reaction products are formulated into aqueous dispersions, which are used as coating baths for electrophoretic coating operation. Properties of the films obtained are almost equal to those of the films obtained in Example 1.

Table 1

| Example No. | Component (A) Epoxy resin | Component (A) Amino compound | Component (B) Polyamide | Component (C) Polyisocyanate compound | Component (C) Blocking agent |
|---|---|---|---|---|---|
| 5 | Epikote*1 828 | Ethanolamine | Tohmide*2 #245 | m-Xylylene diisocyanate | n-Butanol |
| 6 | Epikote 834 | Diethylene triamine | Versamid*3 100 | Tolylene diisocyanate | Hexanol |
| 7 | Epikote 1001 | Hydroxyethyl-aminopropylamine | Tohmide #225-X | Dimer acid diisocyanate | Ethylene glycol monobutyl ether |
| 8 | Epikote 1004 | N-Methyl-piperazine | Tohmide #215-X | Tolylene diisocyanate-ethylene glycol addition product | Ethylene glycol monoethyl ether |
| 9 | Epikote 1004 | Diethylamine : 8 m-Xylylenediamine : 2 (molar ratio) | Sebacic acid : 1 Diethylene-triamine : 0.6 Hexamethylene-diamine : 0.5 (molar ratio) | Tolylene diisocyanate-tri-methylol propane addition product | Phenol |
| 10 | Epikote 871 | Ethylenediamine | Adipic acid : 0.5 Succinic acid : 0.5 Triethylene-tetramine : 1.2 (molar ratio) | Tolylene diisocyanate | ε-Caprolactam |
| 11 | Epikote 1001 | Propylamine : 7 4,4'-Diamino-diphenyl | Dimer acid : 1 Diethylene-triamine : 0.75 | Tolylene | Benzyl |

Table 1-continued

| Example No. | Component (A) Epoxy resin | Amino compound | Component (B) Polyamide | Component (C) Polyisocyanate compound | Blocking agent |
|---|---|---|---|---|---|
| | | methane : 3 (molar ratio) | Monoethanol-amine : 0.75 (molar ratio) | diisocyanate | alcohol |
| 12 | Epikote 1004 | Diethanol-amine : 9 m-Phenylene-diamine : 1 (molar ratio) | Dodecylsuccinic acid : 1 Ethylene-diamine : 0.5 Diethylene-triamine : 0.6 (molar ratio) | Isophorone diisocyanate | Cyclo-hexylalcohol |

Note:
*1 Trade mark : product of Shell Chemical Co., Ltd., Japan
*2 Trade mark : product of Fuji Kasei Co., Ltd., Japan
*3 Trade mark : product of Daiichi General Co., Ltd., Japan

COMPARISON EXAMPLE 1

A 500-part quantity of epoxy resin (trade mark: "Epikote 1001," product of Shell Chemical Co., Ltd., Japan), 500 in epoxy equivalent, is dissolved in 300 parts of methyl isobutyl ketone, and 73 parts of diethylamine is added dropwise to the solution at 80 to 100° C. The mixture is heated at 120° C and maintained at the same temperature for 1 hour. Subsequently 174 parts of tolylenediisocyanate is added dropwise to 180 parts of ethylene glycol monoethyl ether at 60 to 80° C, the mixture is heated at 120° C and maintained at the same temperature for 1 hour. The reaction mixture is mixed wth the epoxy resin-amine reaction product obtained above to prepare a resin composition containing about 74% of solids. To the composition (135 parts) are added 5 parts of acetic acid and 860 parts of deionized water to formulate an aqueous dispersion containing 10% of solids and having a pH of 4.0. The dispersion is found to contain some water-insolubles suspended therein. The dispersion is used as a coating bath to electrophoretically cost a degreased steel sheet at 25° C and 190 V for 2 minutes. The coated sheet is baked at 180° C for 30 minutes to obtain a 12-micron thick hard film having a pencil hardness of 5H. The film is poor in smoothness and has defects such as pinholing and cissing. The film becomes swollen with acetone and cracks when a prescribed weight (¼ in. and 1 kg) is dropped thereagainst from 20 cm thereabove. However, when subjected to corrosion resistance test, the film remains free of any change for 240 hours.

The film properties are determined in the same manner as in Example 2.

COMPARISON EXAMPLE 2

A 500-part quantity of epoxy resin of the bisphenol A type ("Epikote 1001"), 500 in epoxy equivalent, is dissolved in 200 parts of toluene, and 73 parts of diethylamine is added dropwise to the solution at 80 to 100° C. The mixture is then heated at 120° C and maintained at the same temperature for 1 hour. To the reaction mixture is further added 280 parts of dehydrated castor oil fatty acid, and the resulting mixture is heated at 110° C first and then progressively to 200° C while removing excess toluol. The mixture is refluxed at the same temperature for 5 hours to effect reaction until the acid value thereof reduces to 5 or lowr while distilling off the resulting water. After the completion of the reaction, the reaction mixture is distilled at a reduced pressure, 300 parts of butyl acetate is added to the residue and the mixture is cooled to 100° C. To the cooled mixture is added 248 parts of a reaction product of tolylene diisocyanate and n-butanol (in 1:1 mole ratio) separately prepared, and the mixture is heated to 120° C and maintained at the same temperature for 2 hours to give a resin composition containing about 79% of solids. To the composition (127 parts) are added 5.6 parts of acetic acid and 127 parts of deionized water to prepare an aqueous dispersion containing 40% of solids. The dispersion is very turbid in white. In the same manner as in Example 2, the dispersion is formulated into a pigment-dispersed composition containing 13% of nonvolatiles and having a pH of 3.8. The composition is used as a coating bath to electrophoretically coat a degreased steel sheet at 30° C and 130 V for 3 minutes. The coated sheet is then backed at 180° C for 30 minutes to obtain a 28-micron thick film having a pencil hardness of H. At 130 V for 3 minutes, the bath has a throwing power of 8.0 cm. When tested for impact resistance with a prescribed weight (½ in., 1 kg) at 50 cm, the film remains unchanged, whereas salt spray test produces marked blistering at the cross-cut portions of the film in 72 hours.

These properties are determined in the same manner as in Comparison Example 1.

What we claim is:

1. A cationic electrophoretic coating composition comprising an aqueous medium and a resinous binder dissolved or dispersed therein, said resinous binder being an acid neutralized product said product being at least one selected from the group consisting of:
   (1) a mixture of
      (a) a reaction product of an epoxy-amine adduct (A) and a partially blocked polyisocyanate (C), in the weight ratio of from 90 to 15 of (A) to from 10 to 85 of (C), and
      (b) a polyamide (B), the weight ratio of (a) to (b) being from 30 to 90 of the former as calculated by the amount of (A) to from 70 to 10 of the latter;
   (2) a reaction product of
      (a) a reaction product of an epoxy-amine adduct (A) and a partially blocked polyisocyanate (C), and
      (b) a polyamide (B), the weight ratio of (A) to (C) in (a) and the weight ratio of (a) to (b) being the same as in (1);
   (3) a mixture of
      (c) a reaction product of a polyamide (B) and a partially blocked polyisocyanate (C), in the weight ratio of from 85 to 10 of (B) to from 15 to 90 of (C), and
      (d) an epoxy-amine adduct (A), the weight ratio of (c) to (d) being from 70 to 10 of the former as calculated by the amount of (B) to from 30 to 90 of the latter; and
  (4) a reaction product of
    (c) a reaction product of a polyamide (B) and a partially blocked polyisocyanate (C), and
    (d) an epoxy-amine adduct (A), the weight ratio of (B) to (C) in (c) and the weight ratio of (c) to (d) being the same as in (3), said epoxy-amine adduct (A) being a reaction product prepared by reacting an epoxy resin with a basic amino compound having at least one basic amino group, said polyamide (B) being a polyamide having at least one basic amino group and said partially blocked polyisocyanate (C) being a polyisocyanate compound having at least one blocked isocyanate group in the molecule and an average of more than zero to not more than one free isocyanate group per molecule.

2. A cationic electrophoretic coating composition as defined in claim 1 wherein the epoxy resin has a molecular weight of about 200 to 4,000.

3. A cationic electrophoretic coating composition as defined in claim 2 wherein the molecular weight is in the range of about 400 to 2,000.

4. A cationic electrophoretic coating composition as defined in claim 1 wherein the epoxy resin comprises a reaction product of bisphenol A and epichlorohydrin.

5. A cationic electrophoretic coating composition as defined in claim 1 wherein the basic amino compound comprises an aliphatic or alicyclic amino compound having a primary and/or secondary amino group.

6. A cationic electrophoretic coating composition as defined in claim 5 wherein the basic aino compound comprises a water-soluble aliphatic monoamine.

7. A cationic electrophoretic coating composition as defined in claim 1 wherein the epoxy resin is reacted with the basic amino compound at a temperature of about 50 to 150° C.

8. A cationic electrophoretic coating composition as defined in claim 1 wherein the polyamide (B) comprises a product prepared by condensation of a dicarboxylic acid and polyamine, a product by reacting a polyamine with an oligomer prepared by the ring-opening polymerization of a lactam, or a polyesterpolyamide of an alkanolamine and dicarboxylic acid.

9. A cationic electrophoretic coating composition as defined in claim 1 wherein the partially blocked polyisocyanate (C) comprises an aromatic polyisocyanate having at least one blocked isocyanate group in the molecule and an average of more than zero to not more than one free isocyanate group per molecule.

10. A cationic electrophoretic coating composition as defined in claim 9 wherein the aromatic polyisocyanate comprises tolylene diisocyanate, xylylene diisocyanate, or an adduct of tolylene diisocyanate or xylylene diisocyanate and a polyol.

11. A cationic electrophoretic coating composition as defined in claim 1 wherein the reaction product of (A) and (C) is obtained by reacting from 75 to 25 parts by weight of (A) with from 25 to 75 parts by weight of (C).

12. A cationic electrophoretic coating composition as defined in claim 1 wherein the reaction product of (A) and (C) is mixed or reacted with (B) in such a proportion that the weight ratio is from 40 to 80 of the former reaction product as calculated by the weight of (A) to from 60 to 20 of the latter (B).

13. A cationic electrophoretic coating composition as defined in claim 1 wherein the reaction product of (B) and (C) is obtained by reacting from 70 to 25 parts by weight of (B) with from 30 to 75 parts by weight of (C).

14. A cationic electrophoretic coating composition as defined in claim 1 wherein the reaction product of (B) and (C) is mixed or reacted with (A) in such a proportion that the weight ratio is from 60 to 20 of the former reaction product as calculated by the weight of (B) to from 40 to 80 of the latter (A).

15. A cationic electrophoretic coating composition as defined in claim 1 wherein the acid to be used for neutralization is a water-soluble organic or inorganic acid.

16. A cationic electrophoretic coating composition as defined in claim 1 wherein the resinous binder has an amine value of about 25 to 400.

17. A cationic electrophoretic coating composition as defined in claim 16 wherein the amine value is in the range of about 50 to 200.

18. A cationic electrophoretic coating composition as defined in claim 1 which contains a binder in a concentration of about 3 to 30% by weight.

19. A cationic electrophoretic coating composition as defined in claim 1 which has a pH of about 3 to 9.

20. A cationic electrophoretic coating composition as defined in claim 1 which further contains a neutral or cationic water-soluble resin.

21. A process for preparing a cationic electrophoretic coating composition comprising the steps (I) and (II), said step (I) being at least one selected from the group consisting of:
  1. mixing or reacting
    (a) a reaction product of an epoxy-amine adduct (A) and a partially blocked polyisocyanate (C), in the weight ratio of from 90 to 15 of (A) to from 10 to 85 of (C), and
    (b) a polyamide (B), the weight ratio of (a) to (b) being from 30 to 90 of the former as calculated by the amount of (A) to from 70 to 10 of the latter; and
  2. mixing or reacting
    (c) a reaction product of a polyamide (B) and a partially blocked polyisocyanate (C), in the weight ratio of from 85 to 10 of (B) to from 15 to 90 of (C), and
    (d) an epoxy-amine adduct (A), the weight ratio of (c) and (d) being from 70 to 10 of the former as calculated by the amount of (B) to from 30 to 90 of the latter; said step (II) consists essentially of dissolving or dispersing the resulting mixture or/and reaction product in an aqueous medium by neutralization with an acid.

* * * * *